(12) United States Patent
Micheli

(10) Patent No.: US 8,052,196 B1
(45) Date of Patent: Nov. 8, 2011

(54) COVER SUPPORT ASSEMBLY, A COVER ASSEMBLY, AND A METHOD FOR MAKING A COVER ASSEMBLY

(76) Inventor: John Micheli, Dearborn, MI (US)

( * ) Notice: Subject to any disclaimer, the term of this patent is extended or adjusted under 35 U.S.C. 154(b) by 0 days.

(21) Appl. No.: 12/658,310

(22) Filed: Feb. 9, 2010

(51) Int. Cl.
*B60P 7/04* (2006.01)

(52) U.S. Cl. .......................... 296/102; 296/104; 296/163

(58) Field of Classification Search .................. 296/102, 296/104, 105, 100.17, 118, 163, 901.01, 296/205, 193.06, 43; 135/120, 122
See application file for complete search history.

(56) References Cited

U.S. PATENT DOCUMENTS

| | | | |
|---|---|---|---|
| 3,237,362 A * | 3/1966 | Fromson | 428/48 |
| 3,930,680 A | 1/1976 | Littlefield | |
| 4,108,458 A | 8/1978 | Owens | |
| 4,180,143 A | 12/1979 | Clugston | |
| 5,150,762 A | 9/1992 | Stegman | |
| 5,186,513 A * | 2/1993 | Strother | 296/100.15 |
| 5,205,603 A | 4/1993 | Burdette | |
| 5,280,957 A * | 1/1994 | Hentschel et al. | 280/788 |
| 5,401,056 A | 3/1995 | Eastman | |
| 5,513,866 A | 5/1996 | Sisson | |
| 5,660,428 A * | 8/1997 | Catlin | 296/205 |
| 5,716,064 A | 2/1998 | Frerichs | |
| 5,738,362 A | 4/1998 | Ludwick | |
| 5,803,475 A | 9/1998 | Zdick | |
| 5,803,523 A | 9/1998 | Clark | |
| 5,897,125 A | 4/1999 | Bundy | |
| 6,199,894 B1 | 3/2001 | Anderson | |
| 6,237,927 B1 | 5/2001 | Debo | |
| 6,241,312 B1 | 6/2001 | Watts et al. | |
| 6,474,668 B2 | 11/2002 | Debo | |
| 6,488,327 B1 | 12/2002 | Pearse et al. | |
| 6,929,312 B2 * | 8/2005 | Rich et al. | 296/187.02 |
| 6,983,984 B2 * | 1/2006 | Garceau | 296/210 |
| 7,252,168 B2 | 8/2007 | Lin | |
| 7,350,842 B2 | 4/2008 | Leblance | |
| 7,441,809 B1 | 10/2008 | Coombs | |
| 2001/0035625 A1 | 11/2001 | Debo | |
| 2005/0252720 A1 | 11/2005 | Chant | |
| 2006/0130887 A1 * | 6/2006 | Mallookis et al. | 135/122 |

FOREIGN PATENT DOCUMENTS

WO WO/93/01987 2/1993

* cited by examiner

*Primary Examiner* — Dennis Pedder
(74) *Attorney, Agent, or Firm* — John G. Chupa

(57) ABSTRACT

A cover assembly 10 having a cover support portion 30 having various members 34, 36, and 38 each having respective bodies 70 which respectively have a plurality of cells 80 which make the members 34, 36, 38 lightweight and structurally sound, and the members 34, 36, 38 cooperatively deploying a cover 32 over the bed 14 of a selectively movable assembly 12.

7 Claims, 5 Drawing Sheets

COVER SUPPORT ASSEMBLY, A COVER ASSEMBLY, AND A METHOD FOR MAKING A COVER ASSEMBLY

GENERAL BACKGROUND

1. Field of the Invention

The present invention generally relates to a cover support assembly, to a cover assembly and to a method for making a cover assembly and, more particularly, to a series of novel strategies and techniques to provide a generally lightweight, cost effective, and structurally sound cover assembly for use, by way of example and without limitation, on a personnel carrier or some other type of selectively movable assembly.

2. Background of the Invention

Some types of selectively movable assemblies include a bed or portion which is adapted to selectively carry items and personnel. One non-limiting example of such a selectively movable assembly is an armed forces personnel carrier. These types of selectively movable assemblies usually require that this bed or portion be covered, and a cover assembly or frame is usually deployed upon the selectively movable assembly and receives a canvas or other cover. The frame and cover usually and cooperatively define a cover assembly and the cover assembly is effective to protect the carried items and personnel from rain and other undesirable weather related events or elements, as well as providing some protection from other types of environmental events, such as from flying stones.

While these cover assemblies do provide needed protection, they suffer from various drawbacks. For example and without limitation, the frame assemblies are typically heavy, costly, and difficult to deploy. The weight of these frame assemblies not only reduces fuel mileage, but also represents a safety hazard to those sitting under these frame assemblies (e.g., if the relatively heavy frame assemblies were to fail, the heavy elements may strike those positioned within the bed or storage portion of the vehicle, potentially causing bodily harm).

There is therefore a need for a new and improved cover support assembly, for a new and improved cover assembly, and for a new and improved method for making a cover assembly. The present invention provides these improvements.

SUMMARY OF THE INVENTION

It is a first non-limiting object of the present invention to provide a cover support assembly which overcomes some or all of the various drawbacks associated with current and prior cover support assemblies.

It is a second non-limiting object of the present invention to provide a cover assembly which overcomes some or all of the various drawbacks associated with current and prior cover assemblies.

It is a third non-limiting object of the present invention to provide a method for making a cover assembly which overcomes some or all of the various drawbacks associated with current and prior methodologies.

According to a first non-limiting aspect of the present invention, a cover support assembly is provided and includes at least one stave member; at least one corner bow member which is coupled to the at least one stave member; and at least one top bow member which is coupled to the at least one corner bow member and wherein each of the at least one stave member, the at least one corner bow member, and the at least on top bow member has a respective cellular body.

According to a second non-limiting aspect of the present invention, a cover assembly is provided and includes a plurality of substantially identical stave members which are adapted to be selectively secured to a selectively movable vehicle; a plurality of substantially identical corner bow members, wherein each of the plurality of corner members are respectively coupled to a unique one of the plurality of stave members; and a plurality of substantially identical top bow members which are each respectively coupled to a unique pair of the plurality of corner bow members; and a canvas which is selectively and removably attached to the plurality of substantially identical top bow members and wherein each of the substantially identical corner bow members has a cellular body.

According to a third non-limiting aspect of the present invention, a method for making a cover assembly is provided and includes the steps of forming a plurality of corner bow members, each of the corner bow members having a respective body containing a plurality of honeycomb (or other structural geometry) shaped cells; forming a plurality of stave members, wherein each of the stave members having a respective body containing a plurality of honeycomb (or other structural geometry) shaped cells; forming a plurality of corner members, wherein each of the top bow members having a respective body containing a plurality of honeycomb (or other structural geometry) cells; and providing a cover, wherein the cover, the plurality of corner bow members, the plurality of stave members, and the plurality of top bow members cooperate to form a cover assembly.

These and other objects, aspects, and advantages of the present inventions will become apparent from a reading of the detailed description of the embodiment, including the subjoined claims, and by reference to the attached drawings.

DETAILED DESCRIPTION OF THE PREFERRED EMBODIMENTS OF THE INVENTIONS

Figure 1:
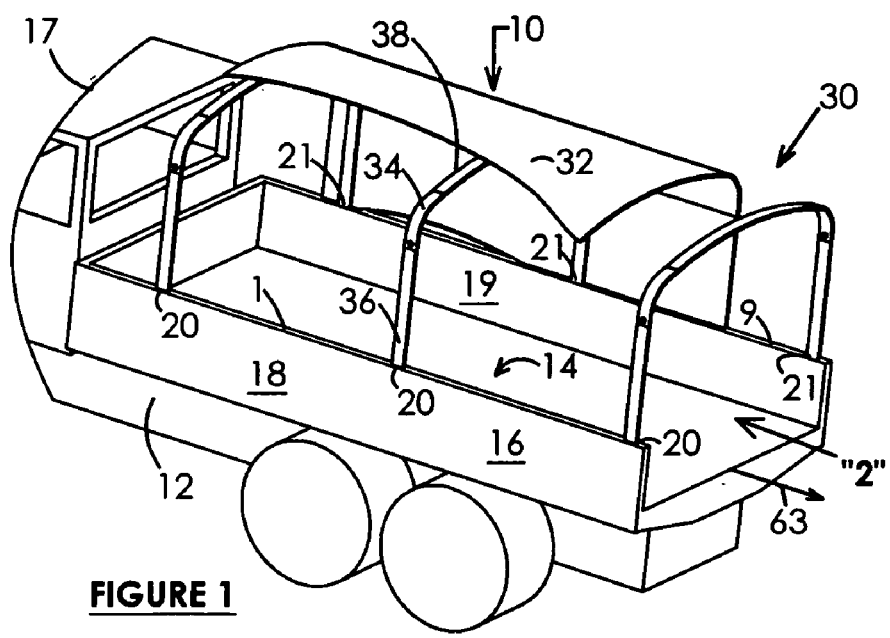
FIG. 1 is a partial side perspective and partially unassembled view of a selectively movable assembly having a cover assembly which is made in accordance with the teachings of the preferred embodiments of the inventions.
Figure 2:
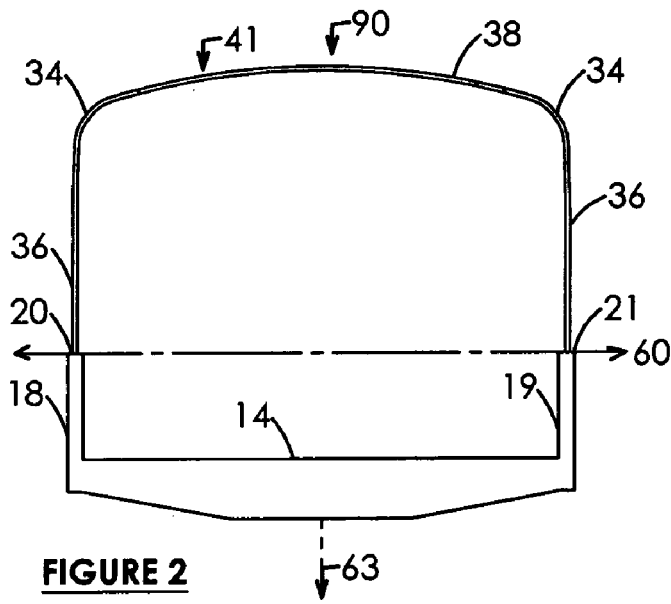
FIG. 2 is a view of the selectively movable assembly which is shown in FIG. 1 and taken in the direction of view arrow "2".

Referring now to FIGS. 1-5 there is shown a cover assembly 10 which is made in accordance with the teachings of the preferred embodiment of the inventions and which is shown, in FIGS. 1 and 2, as being operatively deployed upon a selectively movable assembly or vehicle, such as by way of example and without limitation, a troop or personnel carrier 12.

Particularly, it should be appreciated that nothing in this description should limit the various inventions to any particular type of selectively movable vehicle. As shown, the personnel carrier 12 has a bed or storage area or transportation area 14 upon which item and/or individuals (such as, by way of example and without limitation, troops) may selectively reside and be transported to a desired location. The body 16 of the carrier 12 typically includes a passenger compartment or driver portion 17 which integrally terminates into a pair of substantially identical and linearly coextensive side walls 18 which cooperate with the portion 17 to form the storage area or bed 14.

Each of the side walls 18, 19 has a series of substantially identical, equidistantly spaced, and respective openings 20, 21. It should be understood that a greater or lesser amount of such openings 20, 21 may be utilized in other non-limiting embodiments and that each opening 20 on the sidewall 18 is axially aligned with a unique one of the openings 21 on the sidewall 19. The term "axially aligned", in this context, means lying on an axis which is perpendicular to the longitudinal axis of symmetry 63 of bed 14. Each pair of axially aligned openings 20, 21 cooperatively form a pair of opposed openings 20, 21.

Figure 3:
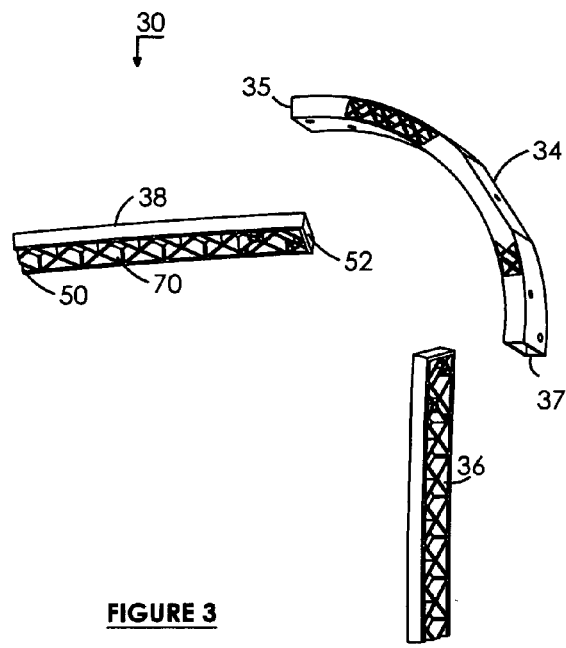
FIG. 3 is an unassembled view of a portion of the cover support assembly which is shown in FIGS. 1 and 2.

As is perhaps best shown in FIGS. 1 and 3, the cover assembly 10 includes a cover support assembly 30 which overlays the formed or defined bed 14 which supports a canvas 32 or some other type of cover and which protectively positions the cover 32 over the bed 14. The cover support assembly 30 includes six substantially identical corner bow members 34, six substantially identical stave members 36, and three substantially identical arcuate top bow members 38. It should be understood that, depending upon the application, a greater or lesser amount of members 34, 36, 38 may be utilized.

Particularly, each stave member 36 is adapted to be respectively and operatively placed within a unique one of the openings 20, 21 and to remain respectively and frictionally secure within the respective unique one of the openings 20, 21. Of course, each stave member 36 may be further secured within each respective opening 20, 21 by the use of pins or other conventional fasteners. Each one of the corner bow members 34 has respective openings 35, 37 and each opening 37 respectively receives a unique one of the stave members 36. Particularly, by way of example and without limitation, each stave member 36 may be secured within a respective and unique one of the openings 37 by the use of pins or other conventional fasteners. Further, each corner bow member 34 has a respective opening 35 and each opening 35 respectively receives a unique end 50, 52 of a unique one of the top bow members 38. The top bow members 38 may be respectively coupled to the member 34 by the use of pins or some other type of conventional fastener, or by a frictional fit type of connection. Particularly, each pair of opposed members 36 (the term "opposed", as used in this context, means stave members 36 which reside along an axis 60 which is perpendicular to the longitudinal axis of symmetry 63 of the bed 14), are respectively coupled to the same top bow member 38. In this manner, each pair of opposed stave members 36 cooperate with the top bow member 38 and corner bow members 34 to which they are coupled to form an arcuate structure which resides over the bed 14. In this non-limiting embodiment, a series of equidistantly positioned and substantially identical arcuate structures reside along and are coupled to the rails 18, 19 and overlay the bed 14.

Figure 4:
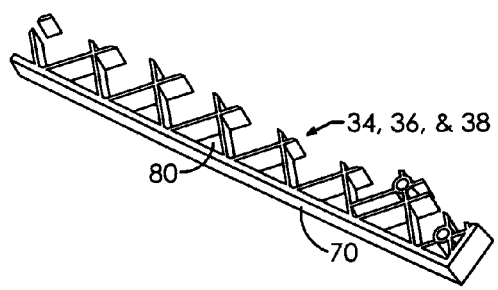
FIG. 4 is a sectional view of a portion of the cover support assembly which is shown in FIG. 3.
Figure 5:
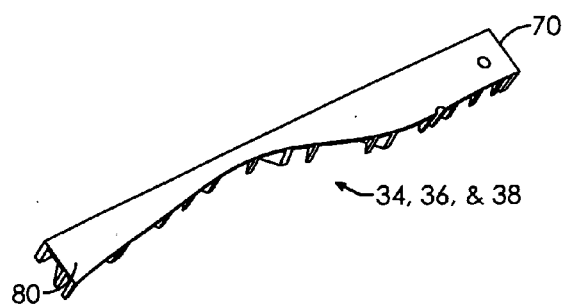
FIG. 5 is a sectional view of a portion of the cover support assembly which is shown in FIG. 3, but made in accordance with the teachings of an alternate embodiment of the invention.

As shown best in FIGS. 4 and 5, each of the members 34, 36, and 38 includes a respective body 70 and each respective body 70 includes (e.g., has formed within respective body 70 and/or on respective body 70) a plurality of cells 80. These cells 80 may or may not be substantially similar in shape and size and these cells 80 may be of a honeycomb design (the term "honeycomb", in this context, means a generally triangular shape), or substantially any other geometrical size and shape which is desired, or any other desired geometrical structural pattern. The cells 80 may be open (e.g., appearing as or forming dimples indentations in the body 70, shown best in FIG. 4), or closed (e.g. appearing as raised nodules or mounds on the bodies 70, shown best in FIG. 5). The respectively formed cells 80 allow the members 34, 38, 36 to be of relatively light weight, but to remain structurally sound. The members 34, 36, 38 may be separately molded and each such respective molding operation may form the respective cells 80. Alternatively, open cells 80 may be respectively "cut out" of the respectively and smoothly formed or molded members 34, 36, 38.

Further, in yet another non-limiting embodiment of the invention, a single integral member may be formed in place of pairs of corner members 34, pairs of attached stave members 36, and an attached center bow member 38. That is, the partial assembly 90, which is perhaps best shown in FIG. 2, may be formed (such as by molding) in a single integral member and this single integral member may be received by two opposed openings 20, 21, such as is shown in FIG. 2. Member 38 may also and alternatively be formed as a single unitary member or in a plurality of segments which may be selectively joined and thereafter cooperatively form the member 38. These pluralities of segments complement or enhance the storage space requirements.

Figure 9:
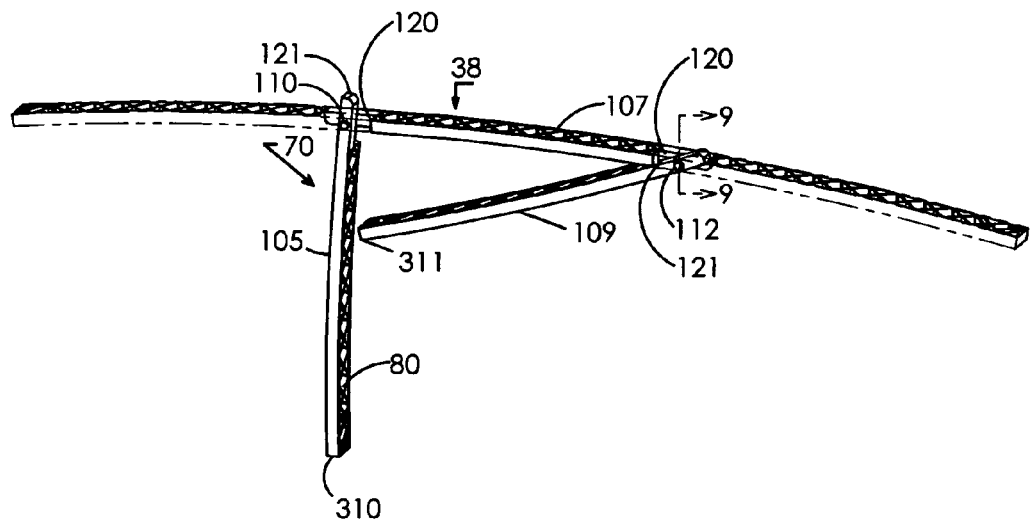
FIG. 9 is a partial side view of the top bow portion of the cover assembly shown in FIGS. 1-3, but made in accordance with the teachings of yet another alternate embodiment of the invention.
Figure 10:
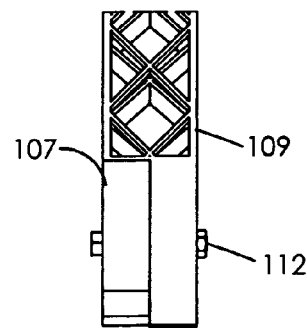
FIG. 10 is a partial sectional view of the cover assembly portion shown in FIG. 9 and taken along section "9-9".
Figure 11:
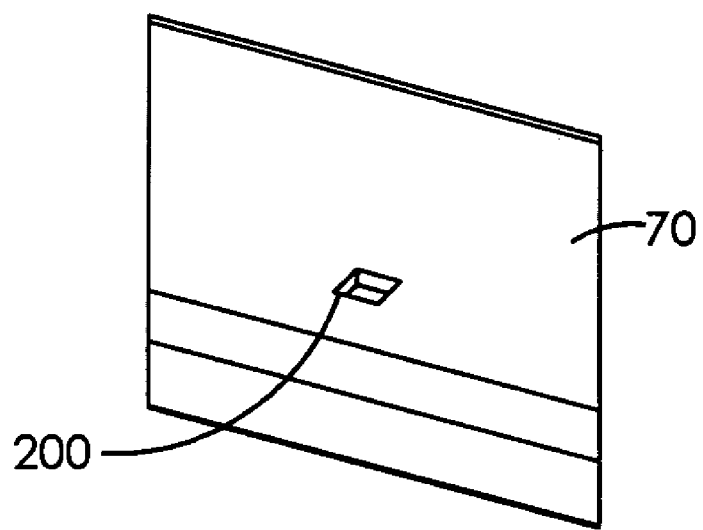
FIG. 11 is an exploded partial view of member 34 of FIG. 3.

That is, as shown best in FIGS. 9, 10, top bow member 38, in another alternate embodiment of the invention includes a body 70 having three distinct body portions 105, 107 109 and each distinct body portion 105, 107 has respective cells 80. The cells may be similar or dissimilar and may either be respectively opened or of a respectively closed configuration. The first body portion 105 is pivotally coupled to body portion 107 by use of pin 110 and a pin 112 coupled the body portion 107 to portion 109.

The pins 110, 112 cooperatively allow the portions 105, 107, 109 to be collapsed (e.g., members 109, 107 may each be folded over portion 105) to facilitate storage and then be extended, as shown in FIG. 2, to be coupled to members 36 (e.g., each end 310, 311 is received into or by a unique member 36). In one non-limiting embodiment, respective slots 120, 121 may be formed within portions 107, 109 to facilitate respect to each other.

Figure 6:
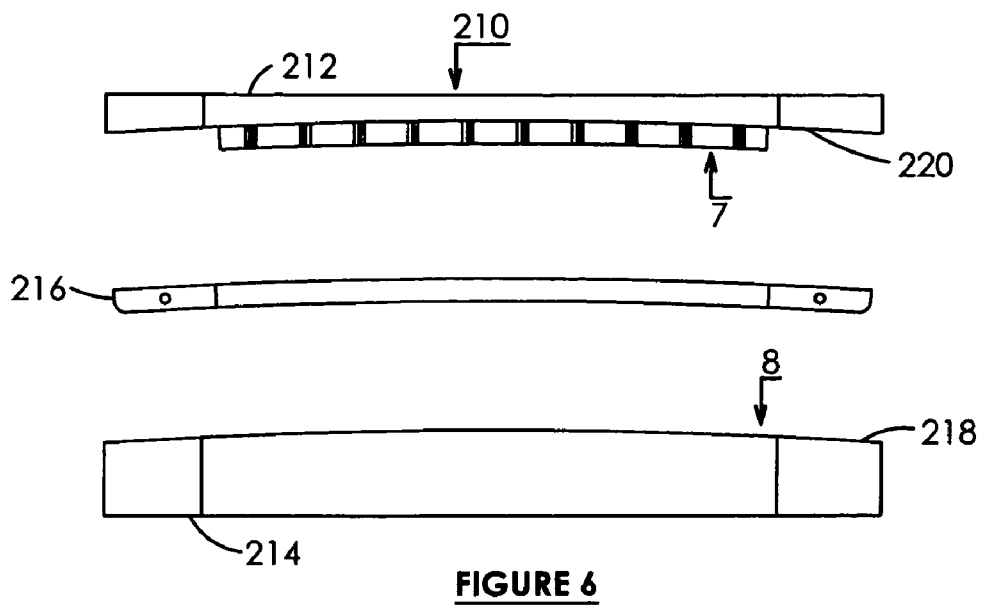
FIG. 6 is a partial side view of a mold which may be used to create portions of the cover assembly shown if FIGS. 1-5.
Figure 7:
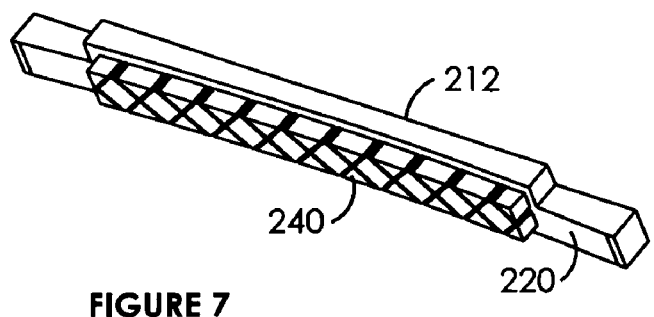
FIG. 7 is a top view of the top interior portion of the mold shown in FIG. 6 according to the teachings of a first embodiment of the invention and taken in the direction of arrow "7"
Figure 8:
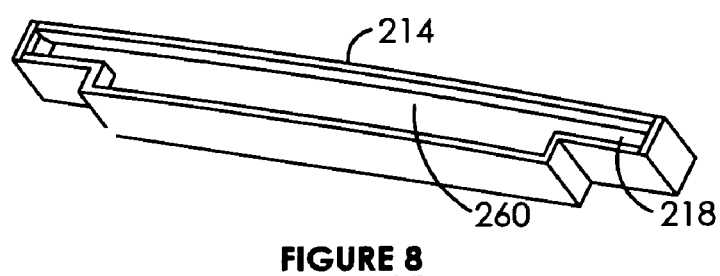
FIG. 8 is bottom interior view of a portion of the mold shown in FIG. 6 according to the teachings of a second embodiment of the invention and taken in the direction of arrow "8".

Referring now to FIG. 6, there is shown a mold 110 which is made in accordance with the teachings of the inventions and which may be used to manufacture/create the various members 34, 36, and 38.

Particularly, mold 210 comprises a pair of selectively and reciprocally moving and forming members 212, 214 (in one embodiment, only member 212 actually moves). A blank of some material 216 is selectively placed on the interior surface 218 of member 214 and the interior surface 220 of the member 212 contacts the member 216 and forms member 216 against interior surface 218. This compression force causes the blank member 216 to be found into one of the various desired members 34, 36, and 38.

That is, in one non-limiting embodiment, the interior surfaces 218 and 220, when they are compressed cooperatively form the size and shape for members 34, 36, and 38. To form closed cells 80, the interior surfaces 212 and/or 214 is (are) made to have depressions 240 and each depression is of a size and a shape which corresponds to a closed cell 80. To form open cells 80, the interior surface 212, 214 is (are) made to have protrusions 260 and each such protrusion 260 is of a size and shape of a depressed open cell 80.

When the blank 116 has been formed into an item 34, 36, and 38, the elements 212, and 214 are made to be selectively moved apart and the respectively formed items 34, 36, and 38 are removed. Alternately, the items 34, 36, and 38 may be formed into a single molding step.

Alternatively, mold 210 comprises an injection type mold and in this non-limiting embodiment, molding material is selectively injected into the formed interior cavity (resides between members 212, 214) and allowed to harden into the desired item 34, 36, 38. After the material hardens, the formed item 34, 36, 38 is removed from the mold 210. Some of the non-limiting alternatives of the present invention include manufacturing the various components, by the use of diverse materials (such as composites), and combining previous multiple assemblies into one assembly, thereby forming for an uncomplicated assembly. Further, generally square injected (preformed) holes 200 may be formed, within the members 34, 36, 38 and such performed or molded holes allow for the members 34, 36, 38 to respectively receive fasteners in a manner so that the fastener is seated in the formed holes 200 and reduces the likelihood of stripping due to continual with tightening and loosening of the fastener.

It is to be understood that various modifications to the various embodiments described above may be made and that the various non-limiting inventions are not constrained or limited by the exact construction or methodology which has been previously described, but that various changes and modifications may be made without departing from the spirit and the scope of the inventions as they are more fully delineated in the following claims.

What is claimed is:

1. A cover support assembly comprising first, second, third, and fourth stave members, wherein each of said stave members have respective opposed ends, a respective body, and respective cells formed within each of said respective bodies; first, second, third, and fourth corner bow members, wherein each of said corner bow members having a respective body and respective cells formed within each of said respective bodies of said four corner bow members, and wherein a first of said stave members is received within said body of said first of said corner bow members, a second of said stave members is received within a second of said corner bow members, a third of said stave members is received within a third of said corner bow members, and a fourth of said stave members is received within a fourth of said corner bow members; and first and second top bow members, wherein each of said top bow members include respective bodies within which a plurality of cells are respectively formed and wherein each of said respective bodies of said first and said second top bow members have respective first and second opposed ends and wherein said first end of said first top bow member traverses through said first of said corner bow members and resides within the body of said first of said corner bow members and wherein said second end of said first top bow member traverses through said second of said corner bow members and resides within the body of said second of said corner bow members, wherein said first end of said second top bow member traverses through said third of said corner bow members and resides within the body of said third of said corner bow members and wherein said second end of said second top bow members traverses through said fourth of said corner bow members and resides within said body of said fourth corner bow members.

2. The corner support assembly of claim 1 further comprising a cover.

3. The corner support assembly of claim 1 wherein each of said cells are open cells.

4. The cover support assembly of claim 1 wherein each of said cells are closed cells.

5. An assembly comprising at least one stave member; at least one corner bow member; and a top bow member having three body portions, wherein a first of said three body portions is movably coupled to a first end of a second of said three body portions and wherein a third of said three body portions being movably coupled to a second end of said second of said three body portions, wherein said top bow member is movable from a first fully extended position in which said first and third body portions respectively extended away in opposite directions from said second body portion, to a second collapsed position which each of said first and third body portions are folded over said second body portion, wherein said at least one corner bow member has internal cavities which are adapted to receive said at least one stave member and said top bow member and wherein said first, second, and third body portions have respective internal cavities in which a plurality of cells are formed.

6. The corner support assembly of claim 5 wherein each of said cells are open cells.

7. The cover support assembly of claim 5 wherein each of said cells are closed cells.

* * * * *